United States Patent Office 3,845,125
Patented Oct. 29, 1974

3,845,125
[DI-(ORTHO SUBSTITUTED)-PHENYL]ALKYLISO-
THIOSEMICARBAZIDES AND DERIVATIVES
Robert C. Tweit, Wilmette, Ill., assignor to
G. D. Searle & Co., Chicago, Ill.
No Drawing. Filed May 23, 1973, Ser. No. 363,302
Int. Cl. C07c 123/00
U.S. Cl. 260—564 E          10 Claims

ABSTRACT OF THE DISCLOSURE

The compounds of the present invention are prepared by reacting [di-(ortho substituted)-phenyl]-alkylhalides with thiosemicarbazide to give the corresponding [di-(ortho substituted)-phenyl]alkylthio-isosemicarbazide hydrohalides. The latter compounds are condensed with dialkyl, phenyl-alkyl, diphenyl or cyclic ketones having 5-12 carbon atoms to form [di-(ortho substituted)-phenyl] alkylthioisosemicarbazone hydrohalides. These compounds are useful as anti-arrhythmic agents.

---

The present invention is concerned with compounds of the formula

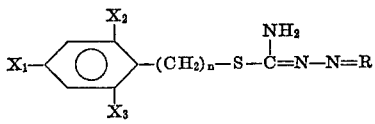

wherein $X_1$ is hydrogen, halo or lower alkyl; $X_2$ and $X_3$ are halo or lower alkyl; $n$ is 1–7, and R is $H_2$ or alkylidene.

The lower alkyl groups are straight or branched-chain hydrocarbon radicals of the formula $C_nH(2n+1)$ wherein $n=1-7$. The alkylidene radical is of the formula

wherein $A_1$ and $A_2$ are lower alkyl or phenyl or are taken together to form a cycloalkylene radical having from 5–12 carbon atoms. Halo and lower alkyl substituted phenyl in $A_1$ or $A_2$ are considered equivalent to phenyl for the purposes of this invention. Polycycloalkylene radicals such as adamantyl are further examples of the alkylidene radicals represented in the foregoing formula.

The preferred phenylalkylthioisosemicarbazide derivatives are those in which $X_2$ and $X_3$ are chloro or methyl and $n$ is 1. The preferred thioisosemicarbazones are those derived from acetone, 2-butanone, 5-methyl-2-hexanone, propiophenone, and cyclododecanone.

The prior art compounds (Beilstein VI, 2nd supplement, pp. 434), wherein $X_1$, $X_2$, $X_3$=H, R=$H_2$ and $X_1$, $X_2$, $X_3$=H and

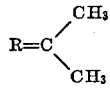

differ from the present compounds in that the latter are di-ortho-halo or di-ortho-lower alkyl substituted. The anti-arrhythmic activity is associated only with di-ortho substituted derivatives. Evidently di-ortho substiution introduces into the molecule a stereoelectronic effect which is required for anti-arrhythmic activity.

The compounds of the present invention are prepared by the sequence of reactions shown in Scheme I.

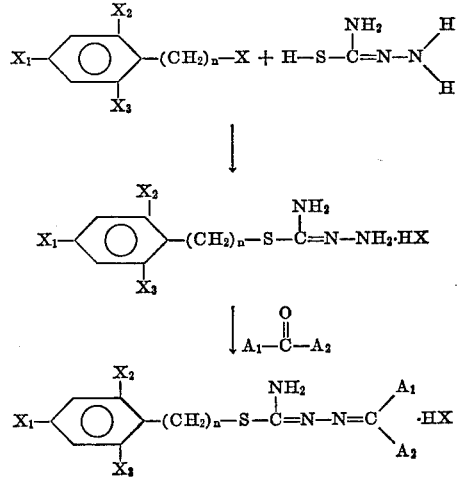

Scheme I

The di-ortho substituted arylalkyl halide is reacted with thiosemicarbazide to give the corresponding arylalkylthioisosemicarbazide hydrohalides as shown in the first step of Scheme I. Arylalkylthioisosemicarbazide hydrohalides undergo a condensation reaction with ketones to form arylalkylthioisosemicarbazone hydrohalides as shown in the second step in Scheme I. This condensation reaction is quite general and is applicable to a large variety of ketones. Thus according to the second step in Scheme I dialkyl, alkyl-aryl, diaryl, cyclic, and polycyclic ketones such as adamantanone can be converted to the corresponding arylalkylthioisosemicarbazone with facility. In a like manner aliphatic and aromatic aldehydes can be converted to the corresponding thioisosemicarbazones.

Using the procedure outlined in Scheme I thiosemicarbazide is mixed with α,2,6-trichlorotoluene in 2-propanol and heated to provide 3-(2,6-dichlorobenzylthio) isosemicarbazide hydrochloride. The latter semi-carbazide is reacted with acetone in methanol to provide 1-(2-propylidene)-3-(2,6-dichlorobenzylthio)isosemicarbazone hydrochloride. The free organic base is obtained by dissolving the hydrochloride salt in aqueous base and extracting the isosemicarbazide or isosemicarbazone into an organic solvent such as ethyl ether.

Also encompassed by the present invention are pharmaceutically acceptable salts of the above compounds, i.e., salts of pharmaceutically acceptable acids. Thus, the compounds indicated form non-toxic salts with a variety of inorganic and strong organic acids. That is, they form salts with sulfuric, phosphoric, hydrochloric, hydrobromic, sulfamic, citric, lactic, maleic, malic, succinic, tartaric, cannamic, acetic, benzoic, gluconic, and related acids. The salts are prepared by reacting the free bases with the respective acid.

The anti-arrhythmic utility of the instant compounds is evident from the results of a standardized test for their capacity to slow the ventricular tachycardia induced by aconitine in the isolated rabbit heart. The procedure is essentially that described by Lucchesi [J. Pharmacol. Exp. Therap., 137, 291 (1962)], modified in certain particulars as follows: Hearts are obtained from adult albino rabbits of either sex and perfused in apparatus modeled after that devised by Anderson and Craver [J. Pharmacol. Exp. Therap., 93, 135 (1948)]. Composition of the perfusion solution is the same as Lucchesi's, but the volume is increased to 200 ml. and the temperature lowered to 28°. Aconitine (ordinarily as the nitrate) is administered as soon as the heart beat is regular and the EKG pattern normal, the dose being so selected as to at least double the rate. Typically, 0.05 ml. of 0.1% aconitine nitrate in physiological saline is injected, EKG's are recorded at five-minute intervals after onset of ventricular tachycardia until two successive readings show stabilization of the rate. Perfusate collected during this time is discarded and replaced with fresh solution, q.s. 200 ml. Promptly following stabilization, 2 mg. of compound dissolved or suspended in 1 ml. of physiological saline, is mixed with the perfusion solution. Ten minutes later a like amount is introduced, followed after a further ten minutes by double the first amount. Final concentration of compound in the perfusion solution is thus 40 mg. per 1. Recording of EKG's is continued at five minutes thereafter. A compound is considered antiarrhythmic if, at any time during the 30 minutes immediately following initial administration in at least half of a minimum of two tests, it reduces by 50% or more the rate recorded ten minutes after onset of tachycardia.

The invention will appear more fully from the examples which follow. These examples are set forth by way of illustration only and it will be understood that the invention is not to be construed as limited either in spirit or in scope by the details contained therein, as many modifications in materials and methods will be apparent from this disclosure to those skilled in the art. In these examples temperatures are given in degrees Centigrade (° C.). Quantities of materials are expressed in parts by weight unless otherwise noted. Pressure is indicated in millimeters (mm.) of mercury.

EXAMPLE 1

18.4 Parts of thiosemicarbazide, 39.1 parts of α,2,6-trichlorotoluene, and 100 parts by volume of 2-propanol are mixed and heated. Methanol is added until all of the solids dissolve. The methanol is removed by distillation and then upon cooling crystals are formed. Recrystallization from methanol provides crystals of 3-(2,6-dichlorobenzylthio)isosemicarbazide hydrochloride, melting at 184–186° with evolution of gas. The formula of this compound is

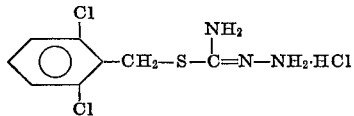

EXAMPLE 2

15 Parts of 3-(2,6-dichlorobenzylthio)isosemicarbazide hydrochloride is mixed with 100 parts by volume of acetone and sufficient methanol to dissolve the solid. The solution is heated and upon cooling crystals of 1-(2-propylidene) - 3 - (2,6-dichlorobenzylthio)isosemicarbazone hydrochloride, melting at 200–204° with evolution of a gas, are formed. The formula of this compound is

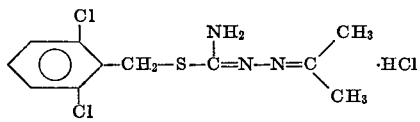

EXAMPLE 3

2.9 Parts of 3-(2,6-dichlorobenzylthio)isosemicarbazide hydrochloride is mixed with 40 parts by volume of 2-butanone and the mixture is heated. Upon cooling crystals are formed. The crystals are separated and recrystallized from methanol to provide 1-(2-butylidene)-3-(2,6-dichlorobenzylthio)isosemicarbazone hydrochloride, melting at 192–192.5 with the evolution of gas. The formula of this compound is:

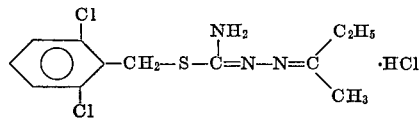

EXAMPLE 4

4.6 Parts of thiosemicarbazide, 8.4 parts of 2,4,6-trimethylbenzylchloride, and 50 parts by volume of 2-propanol are mixed and heated for 12 hours. Upon cooling a solid formed which was separated and then recrystallized from methanol to provide 3-(2,4,6-trimethylbenzylthio)isosemicarbazide hydrochloride, melting at 179–182°. The formula of this compound is

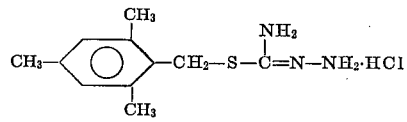

EXAMPLE 5

5 Parts of 3-(2,4,6-trimethylbenzylthio)-isosemicarbazide hydrochloride is mixed with 100 parts by volume of acetone and heated. Enough methanol is added to the hot mixture to complete solution. A portion of the solvent is removed by distillation and a solid separates on cooling. Recrystallization provides 1-(2-propylidene)-3-(2,4,6-trimethylbenzylthio)-isosemicarbazone hydrochloride, melting at 185–186°. The formula of this compound is

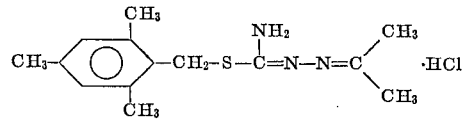

EXAMPLE 6

2.0 Parts of 3-(2,4,6-trimethylbenzylthio)isosemicarbazide hydrochloride, 20 parts by volume of 5-methyl-2-hexanone, and 10 parts by volume of methanol are mixed and heated. The methanol is distilled and the resulting solution is cooled to form a crystalline solid. The solid is separated and recrystallized from methanol-benzene to provide 1-(5-methyl-2-hexylidene)-3-(2,4,6-trimethylbenzylthio)isosemicarbazone hydrochloride, melting at 145–146°. The formula of this compound is

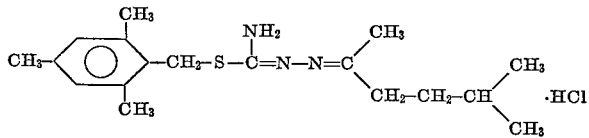

EXAMPLE 7

2.75 Parts of 3-(2,4,6-trimethylbenzylthio)-isosemicarbazide hydrochloride, 1.35 parts of propiophenone, and 20 parts by volume of methanol are mixed and heated. The solvent is then removed by distillation and on cooling a solid is formed. Trituration with ether-methanol provides crystals of 1-(ethylbenzylidene)-3-(2,4,6-trimethylbenzylthio)isosemicarbazone hydrochloride, melting at 181–183°. The formula of this compound is

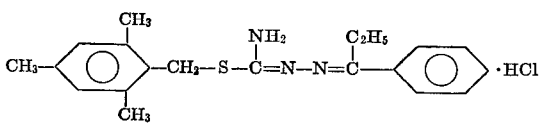

EXAMPLE 8

2.75 Parts of 3-(2,4,6-trimethylbenzylthio)isosemicarbazide hydrochloride, 1.8 parts of cyclododecanone and 20 parts by volume of methanol are mixed and heated. Upon cooling a solid is formed. The solid is triturated with methanol to provide 1-(cyclododecylidene)-3-(2,4,6-trimethylbenzylthio)isosemicarbazone hydrochloride, melting at 214–217°. The formula of this compound is

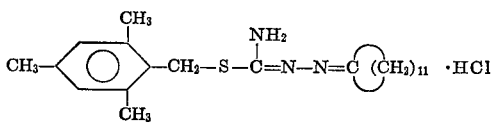

EXAMPLE 9

10 Parts of thiosemicarbazide, 30 parts of 2,4,6-triethylphenethyl bromide, and 100 parts by volume of 2-propanol are mixed and heated. Methanol is added until all of the solids dissolve. The methanol is removed by distillation and upon cooling crystals are formed. Recrystallization from methanol provides 3-(2,4,6-triethylphenethylthio)isosemicarbazide hydrobromide. The formula of this compound is

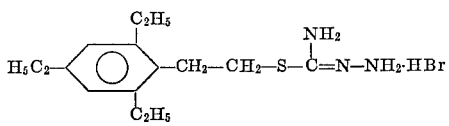

EXAMPLE 10

2.9 Parts of 3-(2,4,6-triethylphenethylthio)isosemicarbazide hydrobromide, 1.4 parts of adamantanone, and 20 parts by volume of methanol are mixed and heated. The solvent is removed and crystallization provides 1-(adamantylidene)-3-(2,4,6 - triethylphenethylthio)isosemicarbazone hydrochloride. The formula of this compound is

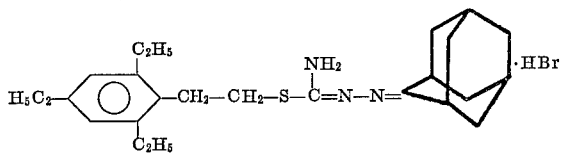

EXAMPLE 11

18 Parts of thiosemicarbazide, 50 parts of 2,4,6-tribromobenzyl bromide, and 100 parts by volume of 2-propanol are mixed and heated. Methanol is added until all of the solids dissolved. Cooling, separation of the solid and recrystallization provides 3-(2,4,6-tribromobenzylthio)isosemicarbazide hydrobromide. The formula is

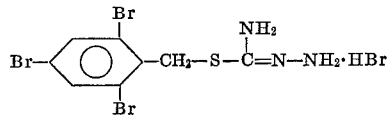

EXAMPLE 12

50 Parts of 3-(2,4,6-tribromobenzylthio)isosemicarbazide hydrobromide, 1.4 parts benzophenone, and 18 parts by volume of methanol are mixed and heated. Methanol is added until all of the solid dissolves. Cooling, separation of solids and recrystallization provides 1-(diphenylmethylene)-3-(2,4,6 - tribromobenzylthio)isosemicarbazone hydrobromide. The formula of this compound is

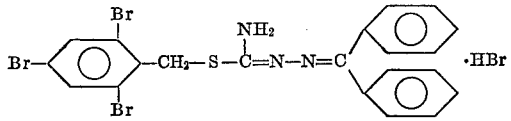

What is claimed is:

1. A member selected from the group consisting of compounds of the formula

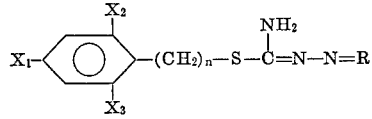

wherein $X_1$ is hydrogen, halo, or lower alkyl; $X_2$ and $X_3$ are halo or lower alkyl; $n=1-7$; and R is $H_2$ or an alkylidene radical of the formula

wherein $A_1$ and $A_2$ are lower alkyl or phenyl, or $A_1$ and $A_2$ are taken together to form cycloalkylene radicals having 5–12 carbon atoms and salts thereof of pharmaceutically acceptable acids.

2. A compound according to claim 1 wherein R is $H_2$ and $n$ is 1.

3. A compound according to claim 1 which is 3-(2,6-dichlorobenzylthio)isosemicarbazide hydrochloride.

4. A compound according to claim 1 which is 1-(2-propylidene) - 3 - (2,6-dichlorobenzylthio)isosemicarbazide hydrochloride.

5. A compound according to claim 1 which is 1-(2-butylidene) - 3 - (2,6 - dichlorobenzylthio)isosemicarbazone hydrochloride.

6. A compound according to claim 1 which is 3-(2,4,6-trimethylbenzylthio)isosemicarbazide hydrochloride.

7. A compound according to claim 1 which is 1-(2-propylidene) - 3 - (2,4,6 - trimethylbenzylthio)isosemicarbazone hydrochloride.

8. A compound according to claim 1 which is 1-(5-methyl - 2 - hexylidene) - 3 - (2,4,6-trimethylbenzylthio)isosemicarbazone hydrochloride.

9. A compound according to claim 1 which is 1-(ethylbenzylidene) - 3 - (2,4,6-trimethylbenzylthio)isosemicarbazone hydrochloride.

10. A compound according to claim 1 which is 1-(cyclododecylidene) - 3 - (2,4,6 - trimethylbenzylthio)isosemicarbazone hydrochloride.

References Cited

UNITED STATES PATENTS 3,513,197  5/1970  Daum et al. _____ 260—564

OTHER REFERENCES

Beilstein, Handbook of Organiche Chemie., vol. VI, 2nd suppl., p. 434.

BERNARD HELFIN, Primary Examiner

G. A. SCHWARTZ, Assistant Examiner

U.S. Cl. X.R.

260—501.14; 424—326, 316